United States Patent [19]

Morser et al.

[11] 4,121,142
[45] Oct. 17, 1978

[54] FULL-WAVE BIDIRECTIONAL DC MOTOR DRIVE CIRCUIT

[75] Inventors: Alfred Harold Morser, Letchworth; Roy Gibson, Biggleswade; Paul Szekely, Watford; Bruce Trayton Parker, Luton, all of England

[73] Assignee: Cincinnati Milacron Inc., Cincinnati, Ohio

[21] Appl. No.: 834,844

[22] Filed: Sep. 20, 1977

[51] Int. Cl.² .............................................. H02P 5/16
[52] U.S. Cl. ......................... 318/345 C; 307/252 UA; 318/341
[58] Field of Search ........... 318/345 C, 345 G, 345 R, 318/501, 505, 706, 341; 302/252 P, 252 T, 252 UA; 323/24, 22 SC; 363/138

[56] References Cited

U.S. PATENT DOCUMENTS

| | | | |
|---|---|---|---|
| 3,651,375 | 3/1972 | Ebersohl | 307/252 T |
| 3,675,104 | 7/1972 | Allison et al. | 318/345 C |
| 3,859,591 | 1/1975 | Saunders | 307/252 UA |
| 3,879,652 | 4/1975 | Billings | 323/22 SC |

Primary Examiner—David Smith, Jr.
Attorney, Agent, or Firm—C. Richard Eby

[57] ABSTRACT

The present invention is a DC motor drive circuit in which each end of a center tapped supply transformer is connected through a pair of back-to-back thyristors to corresponding ends of a center tapped choke coil. The motor armature is connected between the two center taps. After each zero crossing of an AC input signal, a ramp signal is generated. The ramp is comprised of two linear segments of different slopes to improve the linearity of the output of the thyristors as the conduction angle approaches the zero crossing point. Comparator circuits are responsive to the ramp signal and a command signal for generating trigger pulses to the thyristors. The comparators are biased so that with no command signal present, the comparators operate the thyristors to produce a small alternating loop current through the transformer and the choke with each half cycle of the AC input signal. This maintains conduction through all the thyristors without dithering the motor armature.

6 Claims, 6 Drawing Figures

FULL-WAVE BIDIRECTIONAL DC MOTOR DRIVE CIRCUIT

BACKGROUND OF THE INVENTION

The invention relates generally to the area of DC motor drives, and specifically the invention provides a unique circuit configuration for a single-phase full-wave DC motor drive.

Typically, in a DC motor drive circuit, an AC supply is rectified by thyristors whose conduction angle is controlled so as to control the motor armature current thereby controlling some factor such as speed or torque. For full-wave operation, two thyristors are necessary; and for a reversible motor, the number is doubled. The term thyristor as used throughout this specification and in the claims shall mean any type of controlled rectifier, e.g. silicon controlled rectifiers, gate control switches, mutlilayer two-terminal devices, etc.

A typical drive circuit is illustrated in FIG. 1. Four thyristors TH1–TH4 are connected in a bridge circuit which is energized across one diagonal by the secondary winding 10 of a supply transformer. The primary winding 11 being connected to terminals 12 for energization from the main power supply. The gate electrodes of the thyristors are omitted for simplicity. Across the other diagonal of the bridge is connected a choke shown for convenience as two inductors L1 and L2 whose junction constitutes a center tap connected to one motor terminal 13. The other motor terminal 14 is connected to the center tap on the secondary winding 10.

The choke is necessary for various reasons. Apart from improving the form factor and helping, by its leakage impedance, to limit fault currents which could demagnetize permanent magnet motors, it has the essential function of providing a back EMF when the motor is under no-load or virtually no-load conditions. In this connection, it is well-known that when the motor is at a standstill, it is necessary to fire the thyristors over a small conduction angle to keep the circuit ready to respond immediately to a command signal to move or produce a torque in either direction. This would produce very large no-load currents in the absence of the choke. It follows that forward drive is achieved by turning on thyristor TH1 in positive half cycles and thyristor TH3 in negative half cycles. Reverse drive is achieved by turning on thyristor TH4 in positive half cycles and thyristor TH2 in negative half cycles. In this bridge configuration, only one-half of the choke is used in either direction of movement. This limits the power which can be dissipated in the choke and tends to cause DC polarization of the choke. Further, the choke is used inefficiently in that it can only dissipate half the power that it should be able to for its size.

Another disadvantage of the bridge circuit is that all four thyristors have to have separate protective circuits. For simplicity only the protective circuit for thyristor TH3 is shown as a capacitor 15 and resistor 16 in parallel with the thyristor.

The conduction angle is normally determined by adjusting the firing angle in each half cycle within the range of 0° to 180°. The thyristor turns off at 180° with a reactive load because there is no forward current. As will be appreciated by those who are skilled in the art, the conduction angle becomes smaller as the firing angle occurs later. The firing angle is determined by comparing a ramp signal with a comparator input signal. A problem with known circuits is that they use two ramp generators, one for the positive half cycle and one for the negative half cycle. This makes it difficult to insure uniformity of operation between positive and negative half cycles.

Further, prior art circuits control the conduction angle as a linear function of the level of an input signal. Because of the sinusoidal shape of the AC input signal, the mean output voltage is not a linear function of conduction angle but is proportional to the cosine of the conduction angle.

The DC motor drive circuit disclosed herein is effective to overcome the disadvantages recited above.

SUMMARY OF THE INVENTION

According to one embodiment of the invention, a full-wave DC motor drive circuit is claimed for controlling an AC input signal connected to a supply transformer. Said transformer having a center tap in its secondary winding connected to one of two leads of the motor armature circuit. The invention comprises first, a center tapped choke coil having the center tap connected to the other lead of the motor armature. Second, a first pair of oppositely poled thyristors is connected in parallel between one end of the supply transformer and one end of the choke. A second pair of oppositely poled thyristors is connected between the other end of the supply transformer and the other end of the choke. Further means are responsive to each zero crossing of the AC input signal for generating a delayed ramp function comprised of two linear segments for linearizing the thyristor outputs as a function of the conduction angle. Finally, means are responsive to the ramp signal and a command signal for rendering one thyristor in each pair conductive during alternate half cycles of the input signal. Said means being effective in response to a zero command signal to render one thyristor in each pair conductive during each half cycle of the input signal thereby providing a current flow through the supply transformer and the choke but not the motor armature.

DESCRIPTION OF THE PREFERRED EMBODIMENT

Figure 1:
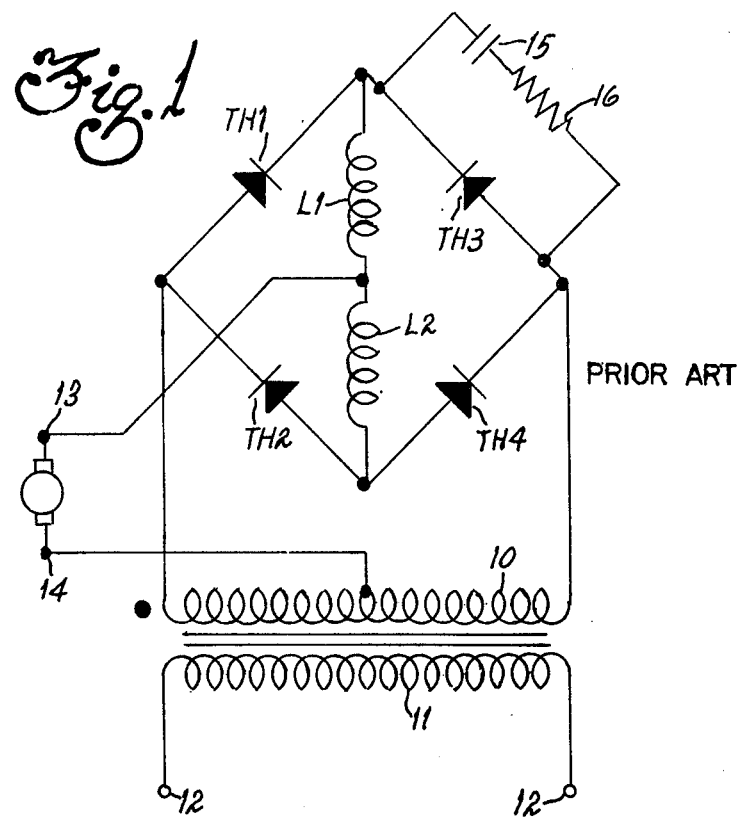
FIG. 1 illustrates a known circuit with thyristors connected in a bridge.
Figure 2:
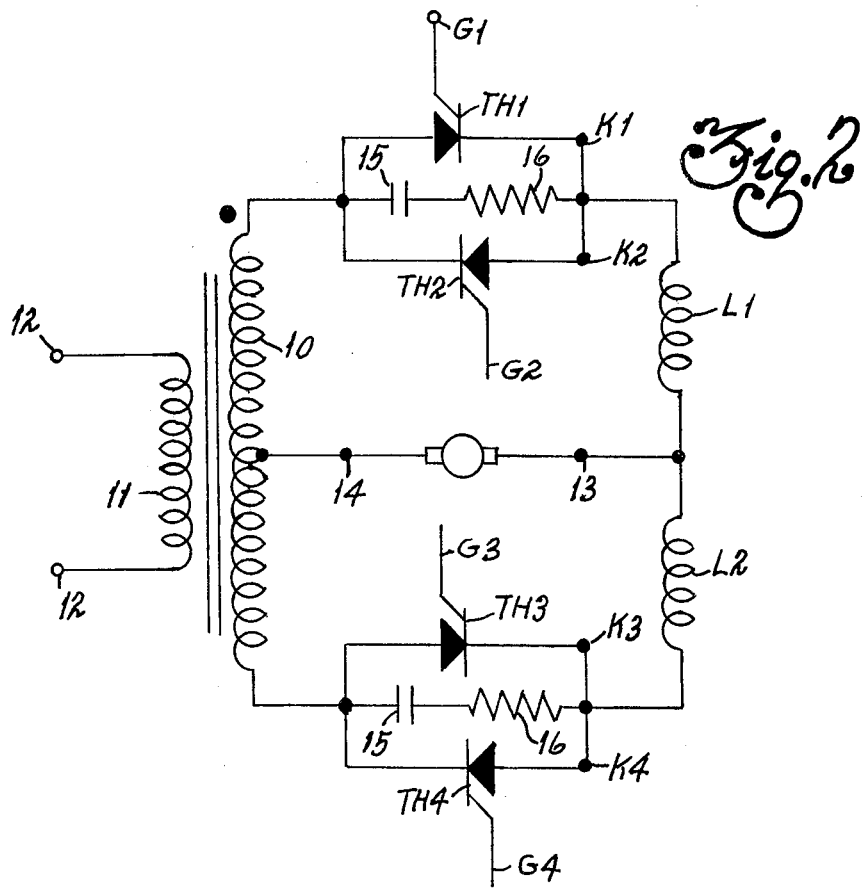
FIG. 2 illustrates a DC motor drive circuit embodying the invention.

In FIG. 2, although a full-wave rectifier connection is used, it is not a bridge connection. When operating the motor in the forward direction, thyristors TH1 and TH3 are rendered alternately conductive during the positive and negative half cycles of the input signal, respectively. Further, during the alternate half cycles, current flows alternately through L1 and L2. Similarly, in the reverse direction, thyristors TH2 and TH4 conduct alternately during positive and negative half cycles respectively. Similarly, current flows through the choke coils L1 and L2. This provides an immediate improvement over the prior art in that the current through the choke L1 and L2 is bidirectional thereby minimizing the polarization effect noted in the prior art circuit. Further, each pair of back-to-back thyristors share a common protective circuit 15 and 16. Consequently, there are only two of these circuits instead of the four as required in the prior art.

Figure 3:
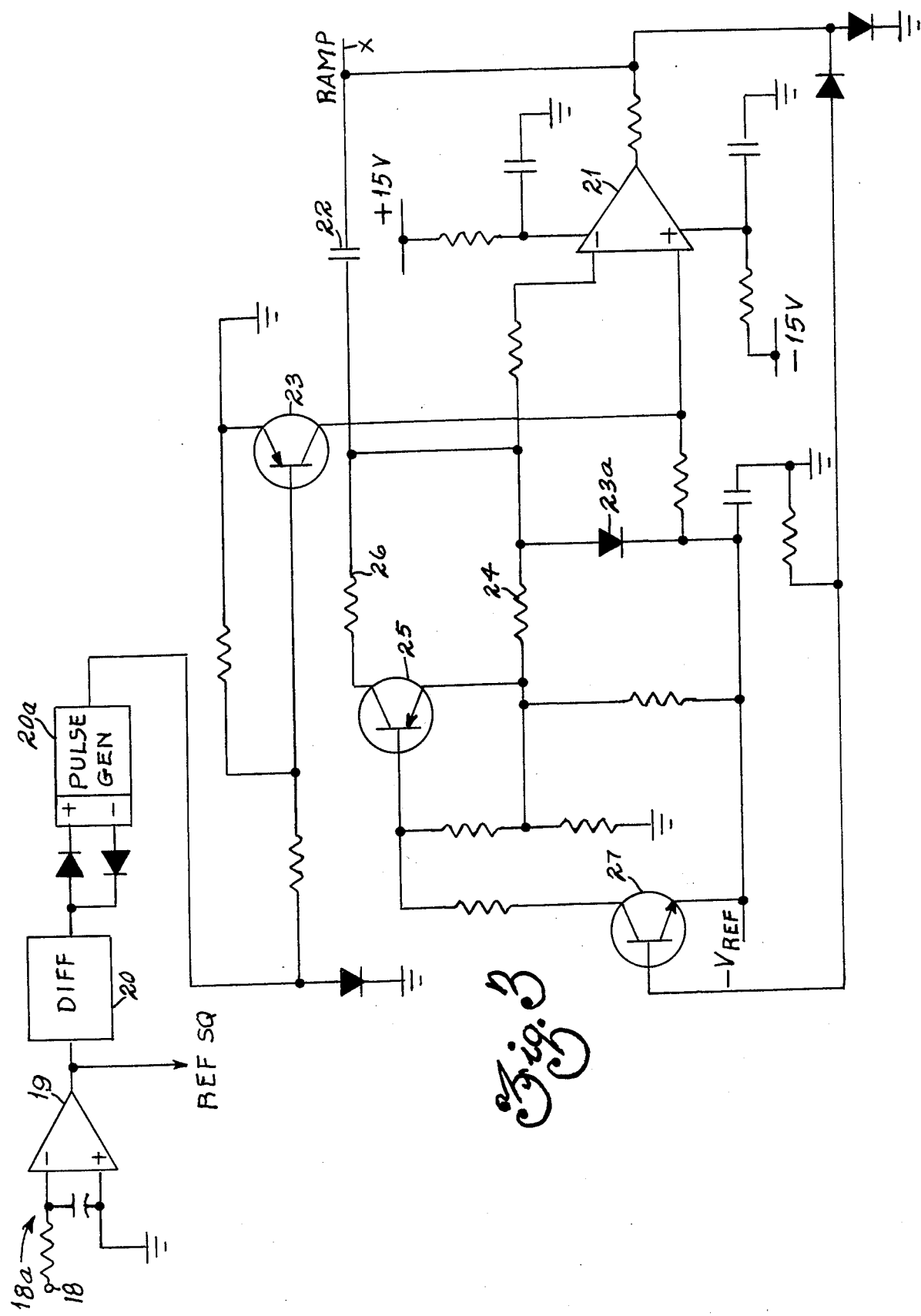
FIG. 3 is a detailed schematic diagram illustrating the disclosed ramp generator.
Figure 6:
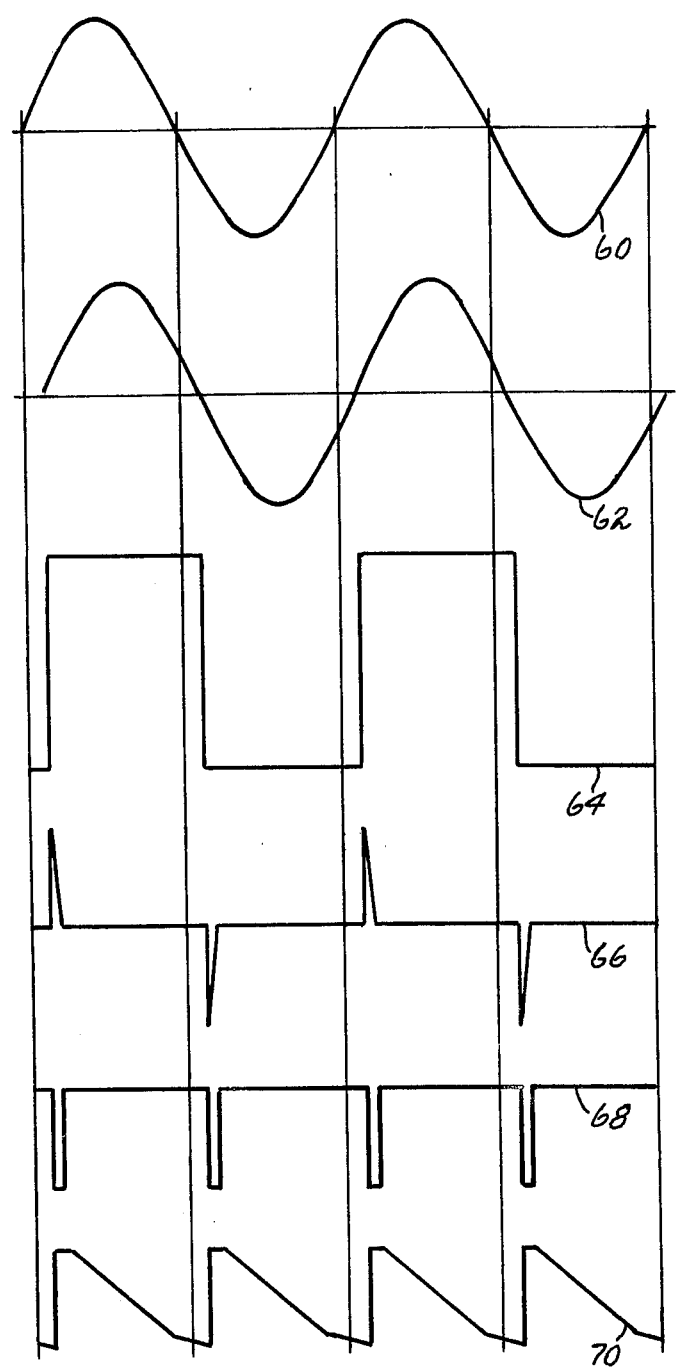
FIG. 6 is a timing diagram illustrating the relationship between various signals in the circuit.

The control circuit which pulses the gates G1 through G4 of the thyristors will now be described. In FIG. 3, an AC input signal, as shown as curve 60 in FIG. 6, is applied to a terminal 18. This input signal is delayed by the RC network 18a to produce a signal as illustrated by curve 62 in FIG. 6. The delayed input signal is squared by saturating an amplifier 19 to produce a signal denoted reference square wave. This is shown by curve 64 of FIG. 6. The square wave is differentiated by a circuit 20 of known form to produce sharp spikes of alternate polarities on each edge of the square wave, as illustrated by curve 66 of FIG. 6. A pulse generator 20a responds to each spike by producing a pulse as illustrated by curve 68 of FIG. 6.

A ramp is generated by operational amplifier 21 with a feedback capacitor 22 and runs from 0 volts down to a negative value as shown by curve 70 of FIG. 6. Each sharp pulse turns on transistor 23 to discharge the integrator via the diode 23a. A new ramp commences immediately thereafter. Charging current initially flows through resistors 24 and 26. When the ramp reaches a predetermined level, a transistor 27 is turned off thereby turning off a transistor 25 so that the charging current flows only through the resistor 24; and the slope of the ramp is thereby decreased. The variable slope ramp is useful for linearizing the output voltage of the thyristors as a function of changes in the conduction angle. $V_{ref}$ is a negative reference voltage which is provided by a regulated power supply and is also used in FIG. 4.

Figure 4:
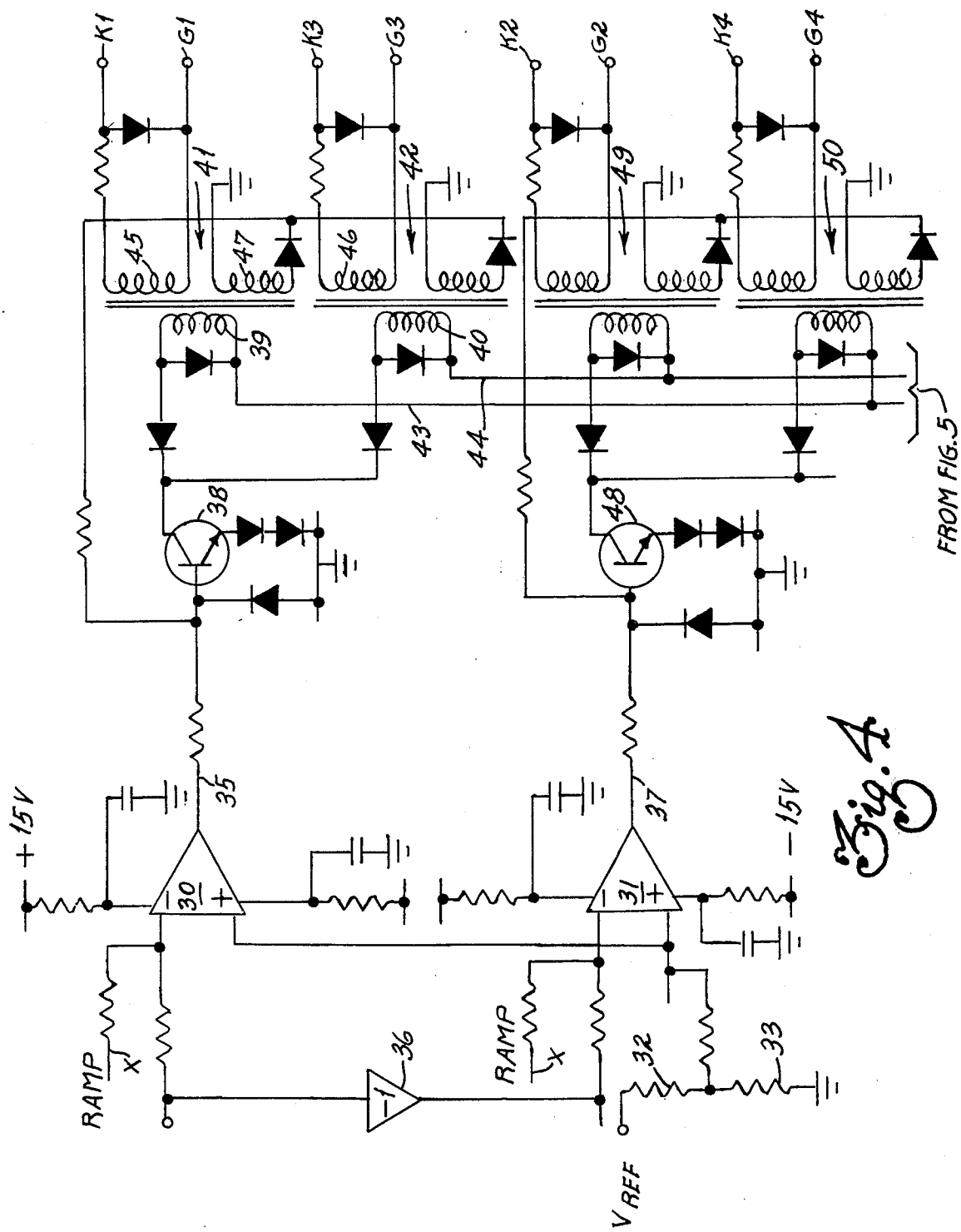
FIG. 4 is a detailed schematic diagram of the comparators and pulse generators.

The output of the ramp generator is at the terminal X labeled ramp and is applied to two similarly labeled terminals in FIG. 4. FIG. 4 includes two comparators 30 and 31 which operate for forward and reverse drive, respectively. Each comparator is constituted by a differential amplifier with a slightly negative reference voltage applied to the plus input from divider resistors 32 and 33 supplied by the aforementioned reference voltage $V_{ref}$. The minus input of the comparator 30 receives the sum of the ramp signal from the terminal X and a command signal from terminal 34. The command signal is zero for no drive. It is negative for foward drive and is positive for reverse drive. When the command signal is positive, it holds the comparator 30 in its quiescent state. When the command signal is negative (foward drive), the comparator threshold is reached; and a forward drive pulse is emitted on the comparator output 35 at a time which occurs earlier in the half cycle the greater the negative value of the command signal.

The command signal is inverted in polarity by inverter 36 and then summed with the ramp signal at the minus input of the comparator 31. Accordingly, this comparator produces a reverse drive pulse on its output 37 when the command signal is positive. This pulse occurs earlier at greater positive value of the command signal.

When the command signal is zero, the bias on the plus inputs of the comparators 30 and 31 is derived from the junction of resistors 32 and 33 which controls the conduction angle of the thyristors by producing very short pulses at the end of each half cycle on both the outputs 35 and 37. As the command signal increases negatively, the pulses on the output 37 are shortened until they disappear, while the pulses on output 35 are correspondingly lengthened by advancing their commencement. The converse applies as the command signal increases positively.

The forward drive pulses on output 35 enable a transistor 38 which has its collector connected to primary windings 39 and 40 of two pulse transformers 41 and 42 respectively. The other ends of the windings 39 and 40 are connected to lines 43 and 44 respectively which receive positive current drive from the circuit of FIG. 5 during positive and negative half cycles respectively of the AC input signal. Current can only flow when the transistor 38 is conductive, and it follows that the transformers 41 and 42 are energized only during forward drive pulses and during positive and negative half cycles respectively on the AC input signal. The transformer 41 has a secondary winding 45 connected to terminals K1 and G1 which are connected to the correspondingly labeled terminals in FIG. 2. Therefore, during forward drive pulses and in positive half cycles of the input signal, the thyristor TH1 is turned on. Similarly, the transformer 42 has a secondary winding 46 connected to terminals K3 and G3 for turning on thyristor TH3 during forward drive pulses in negative half cycles.

The two pulse transformers 41 and 42 have feedback windings 47 connected back to the base of 38 to provide positive feedback thereby insuring maximum pulse power.

Similar arrangements including transistor 48 and pulse transformers 49 and 50 are provided for the reverse drive pulses; and in view of the similarity, these will not be described in detail. It should be noted however that the connections particularly to lines 43 and 44 are such that in the presence of reverse drive pulses, thyristor TH2 is switched on in negative half cycles; and thyristor TH4 is switched on in positive half cycles.

Figure 5:
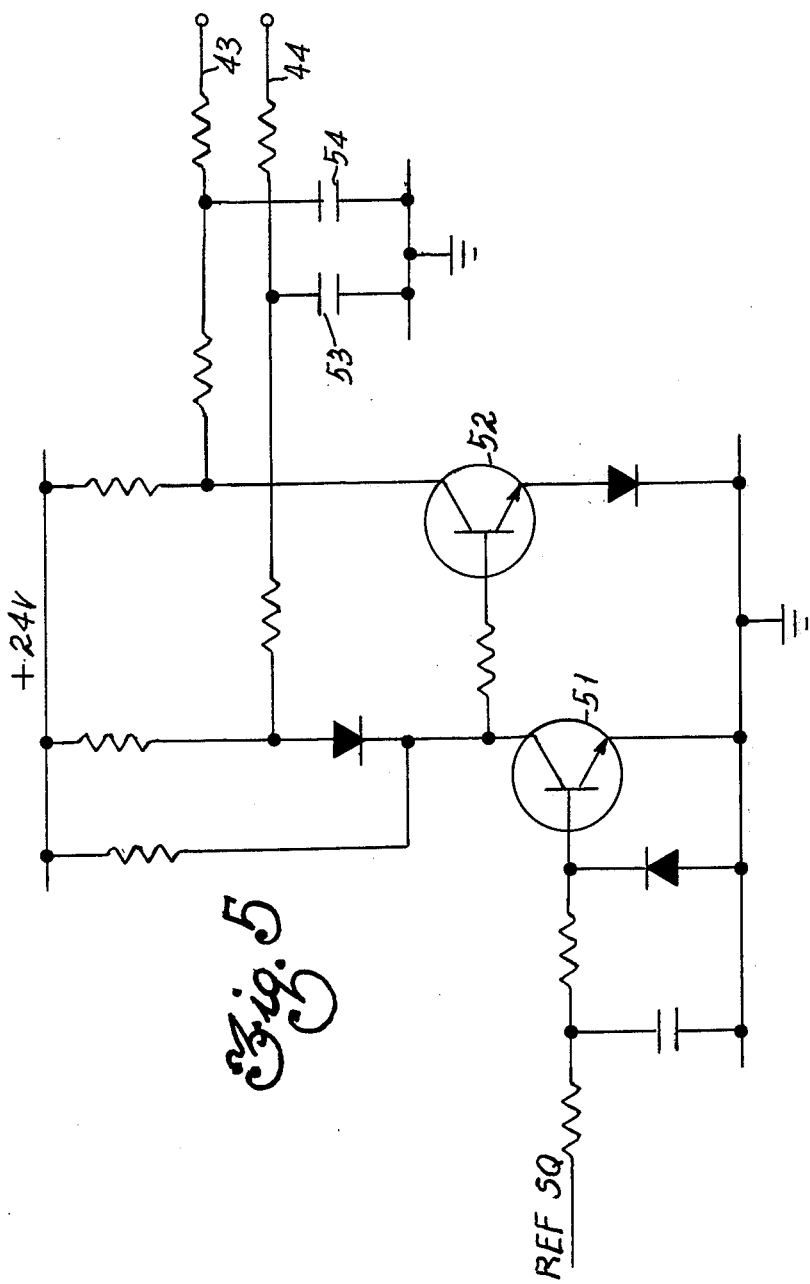
FIG. 5 is a detailed schematic diagram of a current pulse source.

The lines 43 and 44 are correspondingly labeled in FIG. 5 and are connected to two complementary outputs of a two stage amplifier formed by transistors 51 and 52. The amplifier is driven by the reference square wave signal from FIG. 3 at the frequency of the AC input signal, and conduction in either of the two transistors inhibits the charging of capacitors 53 and 54 connected to the lines 43 and 44 respectively in alternate half cycles of the supply frequency. The capacitors are capable of supplying relatively large current pulses to the pulse transformers during positive and negative half cycles respectively when either or both the transistors 38 and 48 are rendered conductive.

When the command signal on terminal 34 of FIG. 4 is zero, it will be appreciated that the simultaneous occurrence of short forward and reverse pulses leads to correspondingly brief switching on of both thyristors TH1 and TH4 in positive half cycles and both thyristors TH2 and TH3 in negative half cycles. Current flows in alternate directions through the supply transformer and the choke coils L1 and L2 to maintain the thyristors in a cross firing condition wherein the motor is not energized thereby minimizing corresponding mechanical dither and consequential wear. However, the dither on the thyristors keeps them in an active readiness to command a forward or reverse drive in response to the deviation of the command signal from zero.

While the invention has been illustrated in some detail according to the preferred embodiments shown in the accopanying drawings, and while the preferred embodiments have been described in some detail, there is no intention to thus limit the invention to such detail. On the contrary, it is intended to cover all modifications, alternations and equivalents falling within the spirit and scope of the appended claims.

What is claimed is:

1. A full-wave DC motor control circuit responsive to a bipolar command signal for controlling an AC input signal being provided to a supply transformer, said supply transformer having a center tap of a secondary winding connected to one of two leads of a motor armature, the control circuit comprising:
   (a) a center tapped choke having the center tap connected to the other lead of the motor armature;
   (b) a first pair of thyristors having
      (1) the anode of the first thyristor being connected to the cathode of the second thyristor and one end of the supply transformer, and
      (2) the cathode of the first thyristor being connected to the anode of the second thyristor and one end of the choke;
   (c) a second pair of thyristors having
      (1) the anode of a third thyristor being connected to the cathode of the fourth thyristor and the other end of the supply transformer, and
      (2) the cathode of the third thyristor being connected to the anode of the fourth thyristor and the other end of the choke;
   (d) means responsive to each zero crossing of the AC input signal for generating a ramp funtion signal; and
   (e) means responsive to the command signal and the generating means for alternately triggering between the pairs of thyristors with each half cycle of the AC input signal to produce a current flow through the motor armature thereby causing the motor to move in accordance with the command signal, said triggering means being effective in response to a zero command signal to simultaneously trigger one thyristor in each pair of thyristors to produce a current flow through the triggered thyristors, the supply transformer and the choke but not through the motor armature.

2. The apparatus of claim 1 wherein the generating means further comprises:
   (a) means responsive to the AC input signal for producing a corresponding delayed square wave signal;
   (b) means responsive to the square wave signal for producing a start pulse in response to each transistion of the square wave signal; and
   (c) means responsive to each start pulse for initiating a ramp function signal for the duration of each half cycle of the AC input signal.

3. The apparatus of claim 2 wherein the means for initiating a ramp function signal further includes means responsive to a predetermined magnitude of the ramp function signal for changing the siope of the ramp function signal.

4. The apparatus of claim 3 wherein the control circuit further includes means for producing a reference signal and the triggering means further comprises:
   (a) means responsive to the ramp function signal, the command signal and the reference signal for producing
      (1) in response to a first polarity of the command signal, a first output signal during each half cycle of the AC input signal, and
      (2) in response to a second polarity of the command signal, a second output signal during each half cycle of the AC input signal,
   said triggering means being responsive to a zero command signal for producing both of said first and second output signals during each half cycle of the AC input signal;
   (b) means for producing first and second current pulses in response to the first and second halves, respectively, of the AC input signal; and
   (c) means responsive to the output signals and the current pulses and connected to the thyristors for providing
      (1) first and third trigger pulses in response to the first output signal and the first and second current pulses, respectively, thereby causing current to flow through the motor armature in one direction, and
      (2) second and fourth trigger pulses in response to the second output signal and the first and second current pulses, respectively, thereby causing current to flow through the motor armature in the opposite direction, said providing means responding to a zero command signal by producing said first and fourth trigger pulses during one half cycle of the AC input signal and the second and third trigger pulses during the other half cycle of the AC input signal, whereby with a zero command signal during alternate half cycles of the AC input signal current flows in opposite directions through the supply transformer and the choke but no current flows through the motor armature.

5. The apparatus of claim 4 wherein the means for producing output signals further comprises:
   (a) a first summing junction having a first input responsive to the ramp function signal and a second input responsive to the command signal;
   (b) a first comparator having a first input connected to an output of the first summing junction and a second input responsive to the reference signal representing the firing level of the thyristors, said first comparator producing the first output signal in response to the sum of ramp function signal and the command signal exceeding the reference signal;
   (c) an inverter circuit responsive to the command signal for generating an inverted command signal;
   (d) a second summing junction having a first input connected to the ramp signal generator and a second input responsive to the inverted command signal;
   (e) a second comparator having a first input connected to an output of the second summing junction and a second input responsive to the reference signal, said second comparator producing the second output signal in response to the sum of the ramp function signal and the inverted command signal exceeding the reference signal.

6. The apparatus of claim 5 wherein the means for providing trigger pulses further comprises:
   (a) a first switching circuit connected to the first comparator for providing continuity therethrough in response to the first output signal;

(b) a second switching circuit connected to the second comparator for producing continuity therethrough in response to the second output signal;
(c) a first pulse transformer having inputs responsive to the first switching circuit and the first current pulse and an output connected to the first thyristor in the first pair of thyristors for producing the first trigger pulse;
(d) a second pulse transformer having inputs responsive to the first switching circuit and the second current pulse and an output connected to the first thyristor in the second pair of thyristors for producing the third trigger pulse;
(e) a third pulse transformer having inputs responsive to the second switching circuit and the second current pulse and an output connected to the second thyristor of the first pair of thyristors for producing the second trigger pulse; and
(f) a fourth pulse transformer having inputs responsive to the second switching circuit and the first current pulse and an output connected to the second thyristor of the second pair of thyristors for producing the fourth trigger pulse.

* * * * *